Figure 6:
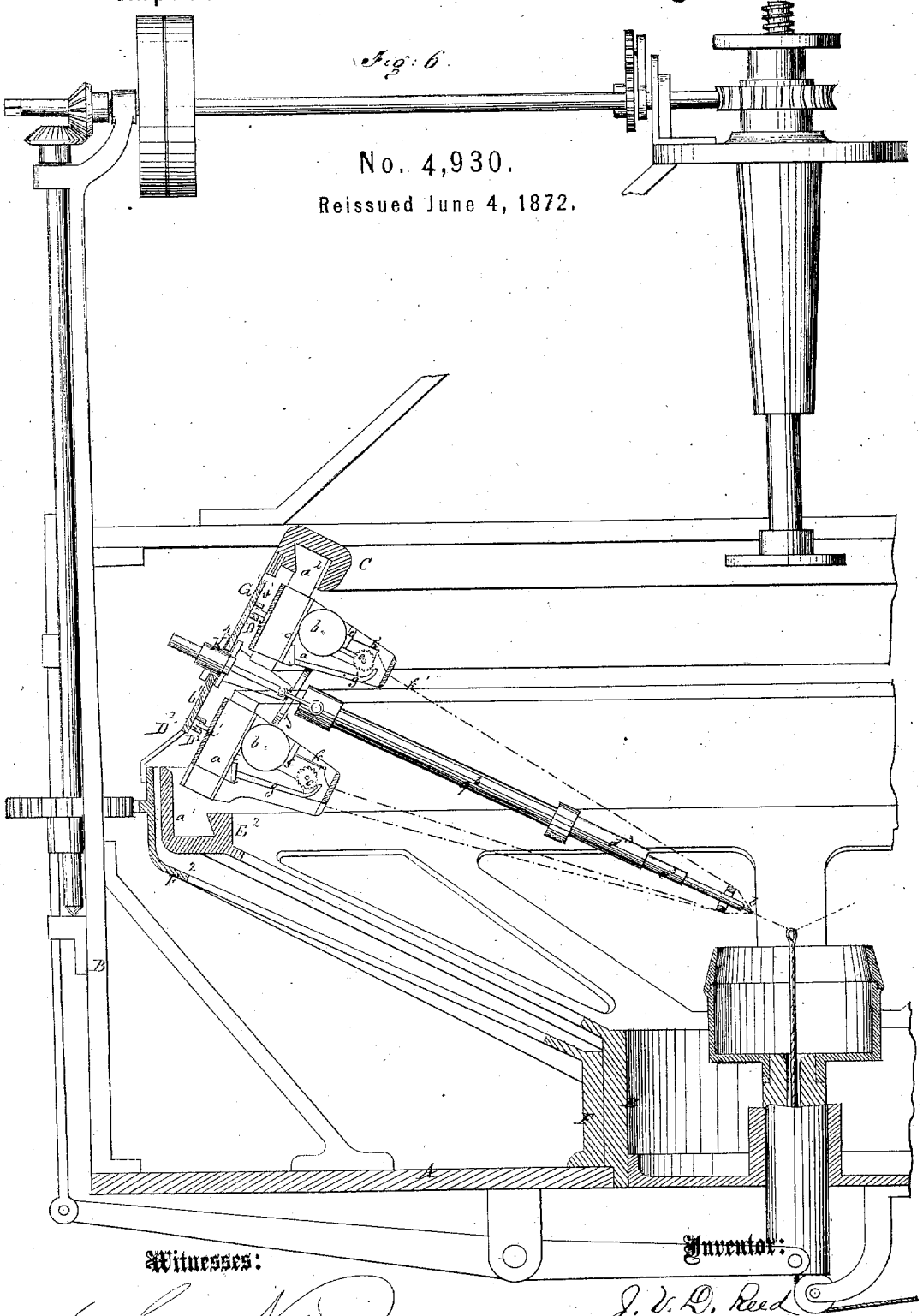

3 Sheets--Sheet 1.
J. V. D. REED.
Improvement in Circular Hat Weaving Looms.
No. 4,930.
Reissued June 4, 1872.
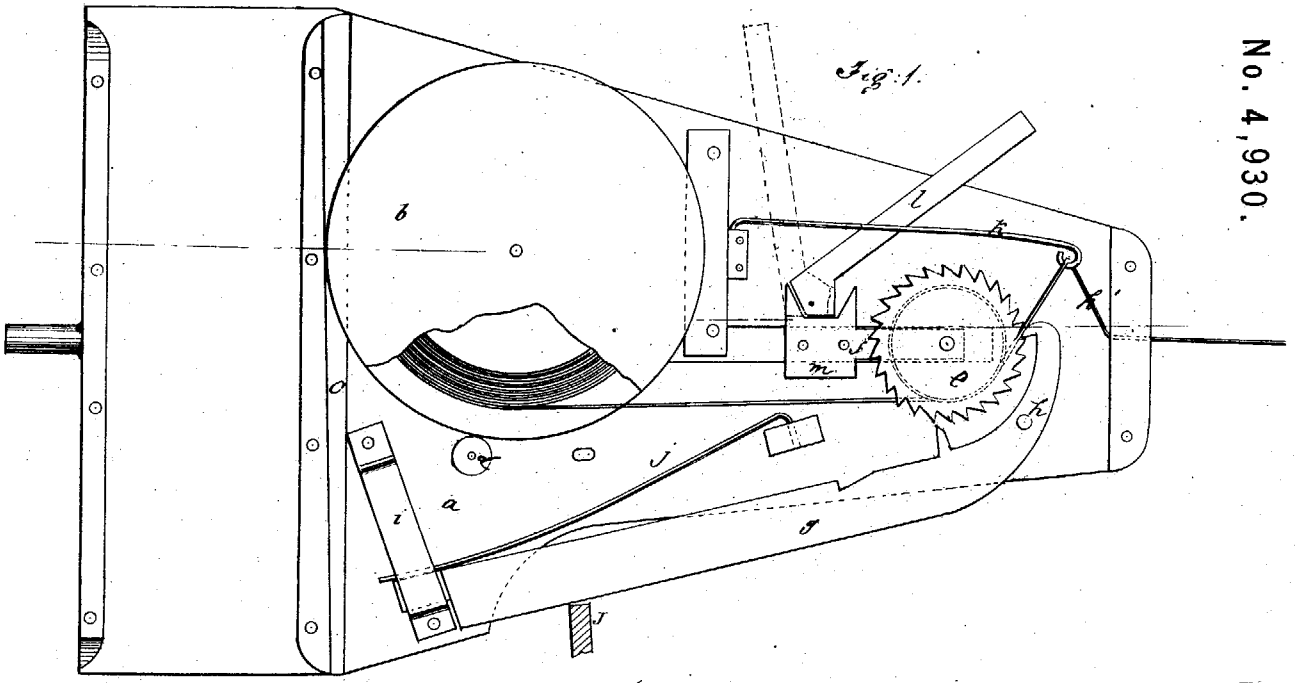
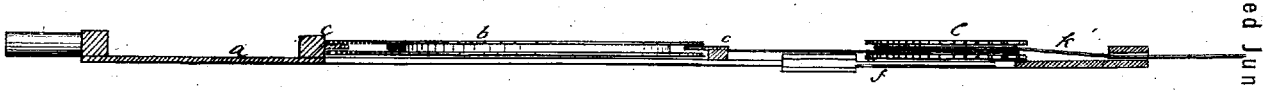
Witnesses:
Chas. Nida
Geo. W. Quabee
Inventor:
J. V. D. Reed
PER
Attorneys.

J. V. D. REED. 3 Sheets--Sheet 2.
Improvement in Circular Hat Weaving Looms.
No. 4,930.
Reissued June 4, 1872.
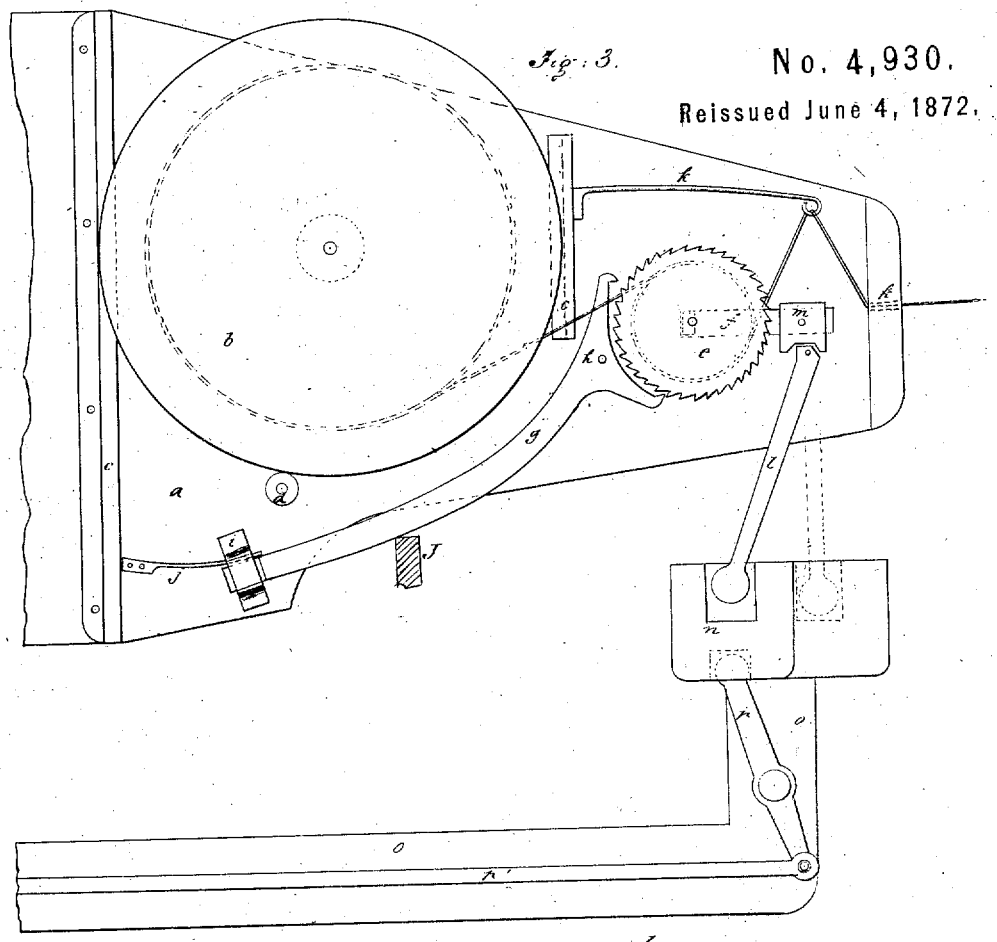
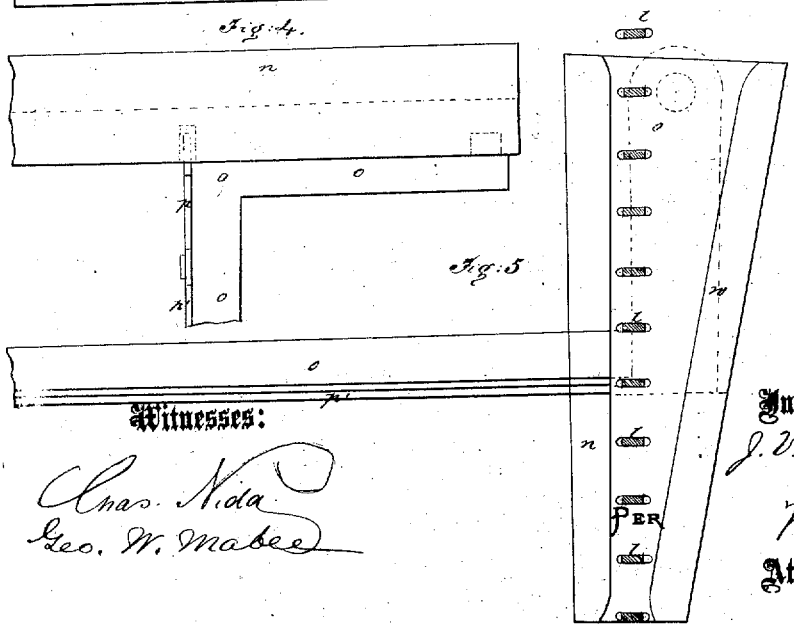
Witnesses:
Chas. Nida
Geo. W. Mabee
Inventor:
J. V. D. Reed
Attorneys.

J. V. D. REED. 3 Sheets--Sheet 3.

Improvement in Circular Hat Weaving Looms.

No. 4,930.

Reissued June 4, 1872.

Witnesses:

Chas. Nida

Geo. W. Mabee

Inventor:

J. V. D. Reed

PER

Attorneys.

UNITED STATES PATENT OFFICE.

JOHN VAN DUSSEN REED, OF NEW YORK, N. Y.

IMPROVEMENT IN CIRCULAR LOOMS.

Specification forming part of Letters Patent No. 124,288, dated March 5, 1872; reissue No. 4,930, dated June 4, 1872.

Specification describing a new and useful Improvement in Hat-Looms, invented by JOHN VAN DUSSEN REED, of the city, county, and State of New York.

The invention consists in a bobbin placed on each warp-carrier, with the warp yarns or strands wound thereon in the usual manner, and all the warp-strands attached at one end to a central holder instead of passing through it to the opposite warp-carrier, using suitable let-out mechanism on each carrier, whereby, as each hat is removed, the warps drawn out from the spools by the removal of the finished hat may be gathered and connected to the said holder, and the weaving may be proceeded with as before, making several hats in succession without having to renew the warps. The invention also consists in the combination, with each warp-carrier which has a large flat spool carrying a considerable length of yarn and with a variable shuttle and filling, of an improved "let-out" mechanism. The spool (above mentioned) carrying the warp-yarn is fitted to rotate freely in guides on the warp-carrier, and so that it can be readily removed and replaced when exhausted. The yarn is led from the spool to the "let-out" mechanism, and through a spring to a hole or guide at the front of the carrier, and thence to the center of the loom, where all the warp-strands are connected to the cord, by which the said warp-strands are drawn down taut when the loom is put in work. The "let-out" mechanism consists of a double-acting spring-pawl gearing with the teeth of a ratchet-wheel, around which the warp-thread is carried, so as to be held firmly thereby and let out in a regular manner by the rotation of the wheel, which moves to the extent of one tooth only at each oscillation of the double-acting pawl-lever, which is actuated by a "lifting-roller" mounted on an arm carried on the shuttle-carriage. The ratchet-wheel is carried on a pivot fixed to a sliding piece working in a slot in the warp-carrier, and moved by a lever also pivoted to the carrier, by which the let-out mechanism may be thrown out of gear when it is necessary to let out a considerable length of warp at once, as for commencing another hat, when all the warp-strands have to be gathered into the center, as mentioned below. This lever may be operated directly by hand or indirectly by a device mounted on an arm fixed to the shuttle-carriage, and working in a somewhat similar manner to the "lifting-roller" above referred to. After a hat has been woven the let-out mechanism is thrown out of gear and the woven hat is drawn down through the "cup" of the loom, which is bottomless, by which action the warp-strands are drawn out or unwound from their spools. They are then gathered together in the center of the loom and held by a suitable device just above the hat already woven, and, the let-out mechanism having been again put in gear, the loom is ready to start again to weave another hat, and so on continuously until the spools in the warp-carriers are exhausted.

The cord heretofore used in the circular-hat machines to draw down the warp is attached to the above-mentioned device, which binds the warp-strands together at the center of the loom to draw down the hat. These warp-strands were heretofore held by a cord at the center of the loom confining them together to aid in forming a shed at the beginning of the operation and to be used in removing the finished hat. Said strands were passed directly through an eye in the aforesaid holder; and heretofore the warps, as far as I am aware, have been used in short lengths.

Figure 1 is a side elevation of the warp-carrier with the parts in combination. Fig. 2 is a plan or edge view of the same; and Fig. 3 side elevation, showing a modified arrangement of devices for connecting and disconnecting the ratchet-wheel with the let-off lever. Figs. 4 and 5 are details of the said apparatus, and Fig. 6 is a sectional elevation of one-half of a circular hat-knitting loom, for which my improvement is designed.

The same letters of reference indicate the same parts in all the figures wherever they occur.

Referring first to Fig. 6, which represents so much of the machine for which the improvement is intended as is necessary to illustrate its application, A is the bed-plate of the machine; B, standards for supporting the upper frame and the stationary ring-plate C. E is the stationary ring for supporting the lower stationary mechanism, and is fitted to the bed-plate A, near the center of the loom, in the form of a cylinder, as a guide or base for another cylinder, F, to revolve around it. This ring supports a ring, $F^2$, which revolves and carries the shuttle-carriage, &c., while the stationary ring E supports the stationary ring $E^2$, on which the lower plates or guides $a^1$ for the warp-carriers are mounted, while the upper plates $a^2$ are supported on the ring C. The said warp-carriers are worked back and forth from one set to the other of these plates for forming the sheds by the grooves formed by the annular bends or rings $D^2$ forming the principal part of the shuttle-carriage, which is carried by the ring $F^2$, said carriers having a projection, $n'$, working in the said grooves. $e^3$, $d^3$, $g^3$, and $k^4$ constitute the shuttle-carrier, and $b$ is the shuttle proper. G′ is the bracket attached to the annular rings for supporting and carrying the shuttle-carrier. J represents the wheel for operating the let-off levers $g$. $a$, Fig. 1, is the warp-carrier, and $b$ is a spool of large dimensions held in guides $c$ fixed on the carrier $a$. These guides are made with flanges, which are received between the two disks of which the spool $b$ is composed, as shown in Fig. 2. The spool is simply slipped between the guides, and rests on a stop or small friction-roller, $d$. $l$ is the ratchet-wheel of the let-out mechanism. It is carried on a pin fixed to a slide, $f$, grooved and fitted in a slot in the carrier, and the rotation of the wheel is controlled by a double-acting spring-pawl, $g$, pivoted at $h$ to the carrier, and one or other tooth of which is always in gear with wheel $e$. $i$ is a yoke in which the tail end of the pawl works, and $j$ is its spring. When the "lifting-roller" J, Fig. 6, passes under the carrier it raises or oscillates the pawl $g$, and therefore fulfils the same function in the case as in the aforesaid machine—namely, to let out the warp, which is effected by the rotation of the ratchet-wheel $e$, which is released and moved and lets out the warp to the extent of one tooth at each oscillation of pawl-lever $g$. The warp-yarn is shown in dotted lines in Fig. 6 and full lines in the other figures. It is led from the bobbin or spool $b$ completely around wheel $e$, thence through a spring, $k$, to a hole, $k^1$, in the end of the carrier, whence it is taken to the center of the loom. The deflection of spring $k$ serves to compensate for the shortening by corrugation of the warp in weaving. $l$ is a lever, pivoted at its extremity to the carrier. This pivoted end is made of the angular form shown, and works in a corresponding angular recess made in a plate, $m$, fastened to the slide $f$. By moving the lever $l$ to the position shown in dotted lines, Fig. 1, the wheel $e$ will be drawn back out of gear with its pawl $g$, thereby permitting any desired quantity of warp to be drawn freely off the bobbin. The wheel $e$ is grooved to receive the warp-strand, and one edge only of its periphery is serrated, the other being plain. The object of making lever $l$ angular at its pivoted extremity is to prevent it being shifted by the tension of the warp on the ratchet-wheel $e$. When the lever $l$ projects above the carrier, as shown in Fig. 1, it must be moved or oscillated as required by hand; but the let-out mechanism may be arranged as shown in Fig. 3, in which case a device, shown in Fig. 5, may be employed to shift the lever $l$. It consists of a grooved guide, $n$, jointed to the end of a rod, $o$, carried by the same or similar bracket on the shuttle-carriage to that which supports the lifting-roller. This guide runs round the loom in advance or in rear of the lifting-roller, and is pivoted at its forward end to rod $o$, which is bent as shown, Fig. 3; and the said guide is capable of being readily shifted to either position shown, by means of a lever, $p$, and sliding rod $p'$, operated by hand. The dotted lines show the second position of the ends of levers $l$, which are shifted from one position to the other by the guide in its passage, as shown by said dotted lines.

The shuttle-carrier $e^3$ $d^3$ $g^3$ $k^4$ before mentioned is so constructed as to allow the shuttle to recede from the center of the loom as the weaving of the crown of the hat proceeds, and so cause the circumference of the circle described by the shuttle to increase, and thereby vary the filling, as required by the progress of the weaving. The shuttle proper $b$ is attached to one end of a short shaft, the opposite end of which is fastened to the inside of a tube, $e^3$, which extends some distance up a larger tube, $g^3$, into which it is drawn by a screw to draw back the shuttle, as required.

Having thus described my invention, I claim as new and desire to secure by Letters Patent—

1. In a loom for weaving circular goods having the warp yarns or strands arranged radially, as herein shown, I claim the warp-spools mounted on the shed-forming carriers, and having the warp yarns or strands extended therefrom to the center, and connected at the ends with a holder thereat, in combination with a variable shuttle and filling, substantially as herein described.

2. The combination, with the carrier $a$ and spool $b$, of the improved "let-out" mechanism, arranged and operating substantially as hereinbefore described and shown in the drawing.

JOHN VAN DUSSEN REED.

Witnesses:
HENRY T. BROWN,
BENJ. P. SHARP.